(12) United States Patent
Kalevo (10) Patent No.: US 7,796,806 B2
(45) Date of Patent: Sep. 14, 2010

(54) REMOVING SINGLET AND COUPLET DEFECTS FROM IMAGES

(75) Inventor: Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 1020 days.

(21) Appl. No.: 11/527,326

(22) Filed: Sep. 25, 2006

(65) Prior Publication Data

US 2008/0075354 A1    Mar. 27, 2008

(51) Int. Cl.
   G06K 9/00    (2006.01)
   G06K 9/40    (2006.01)
(52) U.S. Cl. .................. 382/149; 382/145; 382/254
(58) Field of Classification Search ........... 382/141, 382/145, 149, 254, 260; 358/1.9, 1.1, 3.26, 358/3.04, 3.03, 3.02, 3.01; 348/245, 246, 348/247, 241, 242, 251, 252
   See application file for complete search history.

(56) References Cited

U.S. PATENT DOCUMENTS

| | | | |
|---|---|---|---|
| 5,047,863 A | 9/1991 | Pape et al. | |
| 6,940,549 B2 * | 9/2005 | Dillen et al. | 348/246 |
| 6,970,194 B1 * | 11/2005 | Smith | 348/247 |
| 7,440,139 B2 * | 10/2008 | Loce et al. | 358/3.03 |
| 2007/0285535 A1 * | 12/2007 | McGillvray et al. | 348/246 |

OTHER PUBLICATIONS http://www.st.com/stonline/stappl/press/news/year2006/p1765.htm.
http://www.foveon.com/article.php?a=67, Direct Image Sensors, Aug. 3, 2006.
Texas Instruments Product Bulletin for a TMS320DM270 Processor for Digital Still Cameras, 3 pages, dated 2003.
"Eyeing the Camera: into the Next Century" by Richard F. Lyon et al, Foveon, Inc., Santa Clara, California, dated Nov. 12, 2002, 7 pages.
Nikon Cool Pix 2500, Research of E2500 v1.1, "Reading a defective pixel map," 6 pages, Jan. 2003.

* cited by examiner

Primary Examiner—Yon Couso (57) ABSTRACT

The specification and drawings present a new method, apparatus and software product for removing at least singlet and couplet defects from images taken by the electronic device using a second rank order detection and correction mechanism for removing these at least singlet and couplet defects.

22 Claims, 4 Drawing Sheets

REMOVING SINGLET AND COUPLET DEFECTS FROM IMAGES

TECHNICAL FIELD

The present invention relates generally to electronic devices comprising cameras and, more specifically, to a singlet and couplet defect removal from images taken by the electronic device.

BACKGROUND ART

Camera sensors are used in mobile devices, wireless devices or camera devices. All the pixels in the camera sensors, such as CMOS (complimentary metal oxide semiconductor) or CCD (charge coupled device) sensors, are not performing similarly. Some of the pixels are jammed to one value. Some of pixels are responding faster or slower than the others, etc. Those pixels that are operating differently than the other neighbor pixels are classified as pixel defects. In the image sensor there can be singlet defects, couplet defects or defect clusters. A singlet defect means that there is no other defect pixel, e.g., in the same colored 3×3 pixel neighbors. A couplet defect means that there are two colored defect pixels of the same color connected to each other and the defect clusters mean that there are more than two defects connected to each other.

The problem is how the defects can be removed from the images without blurring the image and also with a minimal amount of processing power and memory required for the removal operation. The problem is especially related to the singlet or couplet defect removal, because the defect clusters are usually too difficult to remove without losing some real details from the image.

There are many different methods for removing those defects. For example, the defects can be removed from a resultant image, but this is not a good place for this kind of operation because the defect values are already spread to the other pixels after, e.g., CFA (color filter array) interpolation. Some manufacturers are removing the defects in the camera sensor module (e.g., using CMOS sensor) or in a separate processing chip simultaneously with other image processing. Typically, there are two different methods used. The first one is a median based filter and it can sometimes remove also defect clusters (3×3) (e.g., by STMICROELECTRONICS using a sensor) and sometimes only singlet defects (3×1, 1×3) (e.g., by TEXAS INSTRUMENT using hardware). The other method is based on minimum and/or maximum filter and it can remove only the singlet pixel defects (e.g., by TEXAS INSTRUMENT using software). Sometimes there is also a set of different filters used to remove those defects (e.g. used by STMICROELECTRONICS in hardware accelerator) Quite often in DSCs (digital still cameras), that use most often CCD sensors but sometimes also CMOS sensors, the LUT (look-up table) based method for defect removal is used. This LUT based method means that the defect pixel are searched, e.g., during a camera calibration and then their coordinates are stored to the LUT. This LUT is used for each image and the known defects recorded in the LUT are filtered away. This method provides better quality because it does not smooth the other pixels than the defects, but it requires separate camera calibration.

DISCLOSURE OF THE INVENTION

According to a first aspect of the invention, a method comprises: capturing at least one image by an electronic device; and removing at least singlet and couplet defects from the at least one image using a defect detection and correction mechanism with a second or higher order ranking by a predetermined algorithm.

According further to the first aspect of the invention, the defect detection and correction mechanism for each pixel may comprise: determining second order ranking values of all neighboring pixels of the each pixel, wherein the second order ranking values comprise at least one of: a) a second maximum ranking value, and b) a second minimum ranking value. Further, the defect detection and correction mechanism for the each pixel may further comprise: equating a value of the each pixel to the second maximum ranking value if a difference between the value and a predefined first threshold is larger than the second maximum ranking value; equating the value of the each pixel to the second minimum ranking value if the difference between the value and the predefined first threshold is not smaller than the second maximum ranking value, and if a sum of the value and a predetermined second threshold is larger than the second minimum ranking value; and keeping the value of the each pixel unchanged if the difference between the value and the predefined first threshold is not larger than the second maximum ranking value and if the sum of the value and the predefined second threshold is not smaller than the second minimum ranking value. Further still, the first or the second threshold may be between 0.5 and 5 percent of an available dynamic range of the value of the each pixel.

According further to the first aspect of the invention, the defect detection and correction mechanism of the each pixel may further comprise: equating a value of the each pixel to the second maximum ranking value if a difference between the value and a predefined first threshold is larger than the second maximum ranking value; keeping the value of the each pixel unchanged if the difference between the value and the predefined first threshold is not larger than the second maximum ranking value. Further, the first threshold may be between 0.5 and 5 percent of an available dynamic range of the value of the each pixel.

Still further according to the first aspect of the invention, all the neighboring pixels may have the same color as the each pixel. Further, eight neighboring pixels for the each pixel may be used for the determining of the second order ranking values.

According further to the first aspect of the invention, a plurality of images of the at least one image may be captured by the electronic device and the at least singlet and couplet defects may be removed from the plurality of images using the defect detection and correction mechanism with the second or higher order ranking by the predetermined algorithm.

According still further to the first aspect of the invention, the method may further comprise: evaluating each pixel of the plurality of images for a number of defects detected in the each pixel using the defect detection and correction mechanism; marking the each pixel as defected if a number of detected defects for the each pixel in the plurality of the images is larger than a predefined third threshold; creating a map of the defected pixels; and storing the map in a memory of the electronic device for correcting defects in further images.

According still further to the first aspect of the invention, the electronic device may comprise a camera performing the capturing and the removing.

According still further to the first aspect of the invention, at least one image in one of: a) a Bayer image, and b) a downscaled Bayer image.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of the electronic device.

According to a third aspect of the invention, an electronic device, comprises: an image sensor module, for capturing at least one image; a processing module, for removing at least singlet and couplet defects from the at least one image frame using a defect detection and correction mechanism with a second or higher order ranking by a predetermined algorithm.

Further according to the third aspect of the invention, the processing module may be a part of the image sensor module.

Still further according to the third aspect of the invention, the defect detection and correction mechanism of each pixel may comprise: determining second order ranking values of all neighboring pixels of the each pixel, wherein the second order ranking values comprise at least one of: a) a second maximum ranking value, and b) a second minimum ranking value. Further, the defect detection and correction mechanism of the each pixel further may comprise: equating a value of the each pixel to the second maximum ranking value if a difference between the value and a predefined first threshold is larger than the second maximum ranking value; equating the value of the each pixel to the second minimum ranking value if the difference between the value and the predefined first threshold is not larger than the second maximum ranking value, and if a sum of the value and a predetermined second threshold is smaller than the second minimum ranking value; and keeping the value of the each pixel unchanged if the difference between the value and the predefined first threshold is not larger than the second maximum ranking value and if the sum of the value and the predefined second threshold is not smaller than the second minimum ranking value. Still further, the defect detection and correction mechanism of the each pixel may further comprise: equating a value of the each pixel to the second maximum ranking value if a difference between the value and a predefined first threshold is larger than the second maximum ranking value; keeping the value of the each pixel unchanged if the difference between the value and the predefined first threshold is not larger than the second maximum ranking value.

According further to the third aspect of the invention, all the neighboring pixels may have the same color as the each pixel.

According still further to the third aspect of the invention, the eight neighboring pixels for the each pixel may be used for the determining of the second order ranking values.

According yet further still to the third aspect of the invention, the electronic device may be configured to capture a plurality of images of the at least one image and to remove the at least singlet and couplet defects from the plurality of images using the defect detection and correction mechanism with the second or higher order ranking by the predetermined algorithm. Further, the electronic device may be further configured: to evaluate each pixel of the plurality of images for a number of defects detected in the each pixel using the defect detection and correction mechanism; to mark the each pixel as defected if a number of detected defects for the each pixel in the plurality of the images is larger than a predefined second threshold; to create a map of the defected pixels; and to store the map in a memory of the electronic device for correcting defects in further images.

According further still to the third aspect of the invention, the electronic device may comprise: a camera comprising the image sensor module and the processing module.

Yet still further according to the third aspect of the invention, the at least one image in one of: a) a Bayer image, and b) a downscaled Bayer image.

Still yet further according to the third aspect of the invention, the image sensor module may be a complimentary metal oxide semiconductor sensor or a charge coupled device.

According to a fourth aspect of the invention, an electronic device, comprises: means for capturing at least one image by an electronic device; and means for removing at least singlet and couplet defects from the at least one image using a defect detection and correction mechanism with a second or higher order ranking by a predetermined algorithm.

According further to the fourth aspect of the invention, the means for capturing may be an image sensor module.

BRIEF DESCRIPTION OF THE DRAWINGS

For a better understanding of the nature and objects of the present invention, reference is made to the following detailed description taken in conjunction with the following drawings, in which:

FIGS. 1$a$ and 1$b$ are schematic representations of colored neighbor pixels of an analyzed current pixel (X0) showing neighbors in an original raw Bayer image (FIG. 1$a$) and the neighbors when only the same color pixels are shown (FIG. 1$b$).

MODES FOR CARRYING OUT THE INVENTION

A new method, apparatus and software product for removing at least singlet and couplet defects from images taken by an electronic device using a second or higher rank order detection and correction mechanism for removing these at least singlet and couplet defects. The electronic device can be, but is not limited to, a camera, a digital camera, a wireless communication device, a mobile phone, a camera-phone mobile device, a portable electronic device, non-portable electronic device, etc.

According to embodiments of the present invention, the singlet and couplet defect removal can be based on the second rank order detection and correction mechanism (i.e., a defect analysis and a correction mechanism with a second order ranking by a predetermined algorithm) applied to, e.g., the raw Bayer images or downscaled Bayer images before any spatial filtering of the captured images, such that this defect removal can be implemented without any other knowledge than the captured images. According to one embodiment, this defect detection and correction mechanism with the second order ranking can be performed with one pass on-the-fly processing solution without any other memory than the line memories required for a typical camera operation. According to another embodiment, a look-up table (LUT) approach utilizing statistics of a plurality of previously corrected images using the defect detection and correction mechanism with the second order ranking and utilizing these statistics for correcting further captured images, such that it can improve the statistics of the corrected defects and the preserved image details.

According to an embodiment of the present invention, this defect detection and correction mechanism with the second order ranking can be implemented in a camera sensor or in an image processor, but before performing any spatial filtering such as, e.g. noise reduction methods, CFA (color filter array) interpolation, etc. These spatial filtering methods will spread the defects which will make the filtering process much more difficult. This defect detection and correction mechanism with the second order ranking can be also applied to a downscaled co-sited Bayer/Bayer images, if the defect correction before the downscaling is not possible. In practice the processing before CFA interpolation means that there is only one color component in the each pixel location available (except for FOVEON type of imaging sensor, where there are already three color planes in the imaging sensor or the downscaling case with co-sited Bayer mentioned above)

Figure 1A:
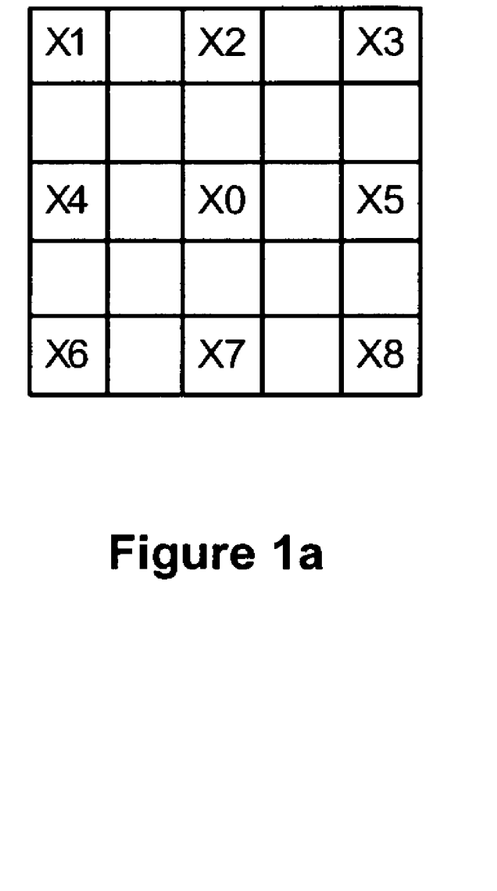
Figure 1B:
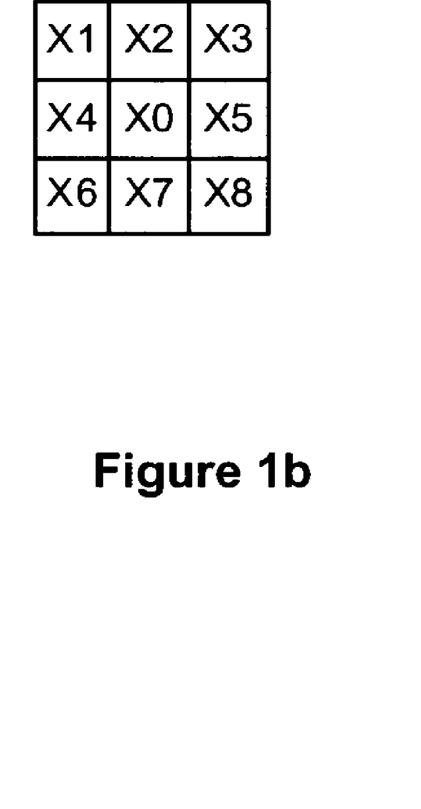

The embodiments of the present invention can also be applied to FOVEON sensors (e.g., by evaluating one color at a time): in this case the distance between pixels is smaller, but pixels are already in a form that are shown in FIG. 1b. The present invention possibly can be also used for detecting display defects. The detection and correction mechanism described herein, in practice, can be applied to all the pixels in the image, because it is not known beforehand where the defects are, but if the sensor is sub-sampled, then the detection and possible correction can be applied only to the pixels that are used from the image. It is also possible to apply this method for some smaller area of the image knowing that there can be problems in other non-evaluated pixels. Also in alternative embodiment, when there is no defect pixel detected from the 3×3 window and neighbor min and max values are close enough (according to a certain algorithm), then we can jump over the next pixel and check the defects from the pixel following this matrix, thus minimizing the processing time.

This defect detection and correction mechanism with the second order ranking using the predetermined algorithm is described below in detail. FIGS. 1a and 1b show schematic representations of colored neighbor pixels of an analyzed current pixel (X0) showing neighbors in an original raw Bayer image (FIG. 1a) and the neighbors when only the same color pixels X1, X2, . . . , X8 are shown (FIG. 1b), wherein X0, X1, X2, . . . , X8 also identify pixel values.

According to an embodiment of the present invention, second order rank values from the neighbors are evaluated by equations:

$$\text{Max2}=2^{nd} \text{ largest value from } (X1, X2, X3, X4, X5, X6, X7, X8) \quad (1),$$

$$\text{Min2}=2^{nd} \text{ smallest value from } (X1, X2, X3, X4, X5, X6, X7, X8) \quad (2).$$

Then the defect detection and correction mechanism for simultaneously removing the singlet and couplet defects can be defined as a filtering operation as follows:

if $(X0-\text{thr1})>\text{Max2}$, then $X0=\text{Max2}$, thus correcting a "hot" or maximum defect (singlet or couplet), wherein thr1 is a predefined first threshold; otherwise (i.e., if $(X0-\text{thr1})$ is not larger than Max2), X0 stays unchanged, if $(X0+\text{thr2})<\text{Min2}$, then $X0=\text{Min2}$, thus correcting a minimum defect, singlet or couplet, (this step may not be needed if only hot defects need to be removed); otherwise (i.e., if $(X0+\text{thr2})$ is not smaller than Min2), X0 stays unchanged.

The predefined first and second thresholds thr1 and thr2 can be chosen between 0 and $2^n-1$ (for a digital implementation, n being the amount of bits used to present the pixel value) and can be used to inhibit the smoothing of the image details, when there is no clear defect.

Moreover, the filtering procedure can be adaptively selected based on the sensor quality and the exposure level. For example, if there is only a need to remove hot pixels, then there is no need to check the minimum values at all. If the thr1 and thr2 values are set to be zero, the filtering will modify all the originals that are larger or smaller than the neighboring pixel values. If the thr1 and thr2 values are set to be $2^n-1$ (n being the amount of bits used to present the pixel value), then none of the pixels are corrected. Typically the values of thr1 and thr2 can be between 0.5 to 5 percents of the available dynamic range from the pixel value, e.g., for 10-bit sensors thr1 and thr2 are typically between 5 and 50.

It is noted that the above algorithm for the defect detection and correction mechanism with the second order ranking can be applied not only to 3×3 matrix of neighboring pixels but also to others, e.g., 5×3, 3×5, 5×5, etc. for defect removal in different images or even within one image (e.g., for correcting pixels on the edges of the image). When the matrix size increases, even higher order rankings (e.g. $3^{rd}$ or $4^{th}$) can be used when the defects are detected and corrected.

It is further important to notice that this algorithm for the defect detection and correction mechanism with the second order ranking is very effective and can correct all the defects in the used SMIA camera sensors. SMIA (standard mobile imaging architecture) specifies the way the defects pixels (singlet, couplet and clusters) are defined and then we can require that only the singlet or couplet defects are allowed in the sensors that we want to use in our products (no clusters are allowed). In other words, if the sensor contains cluster defects then the sensor is not accepted, and in the accepted sensors all the singlet and couplets can be corrected with the method described herein.

According to a further embodiment of the present invention, a plurality of images can be taken and when the pixel value in each of these images is corrected according to the defect detection and correction mechanism described above, its coordinates are saved to a statistics table. According to this embodiment, when a predetermined number of images are captured and corrected for the singlet and couplet defects, each pixel is marked as defected if a number of detected defects for said each pixel in the plurality of the images is larger than a predefined third threshold thr3 (e.g., the value of thr3 can be from 2 to 5 for the plurality of 10 images). Coordinates of the marked pixels can be then saved as a map in a small memory of the electronic device as a look-up table (LUT). This LUT can then be used for correcting the defects in the following images.

It is noted that various embodiments of the present invention recited herein can be used separately, combined or selectively combined for specific applications.

Figure 2:
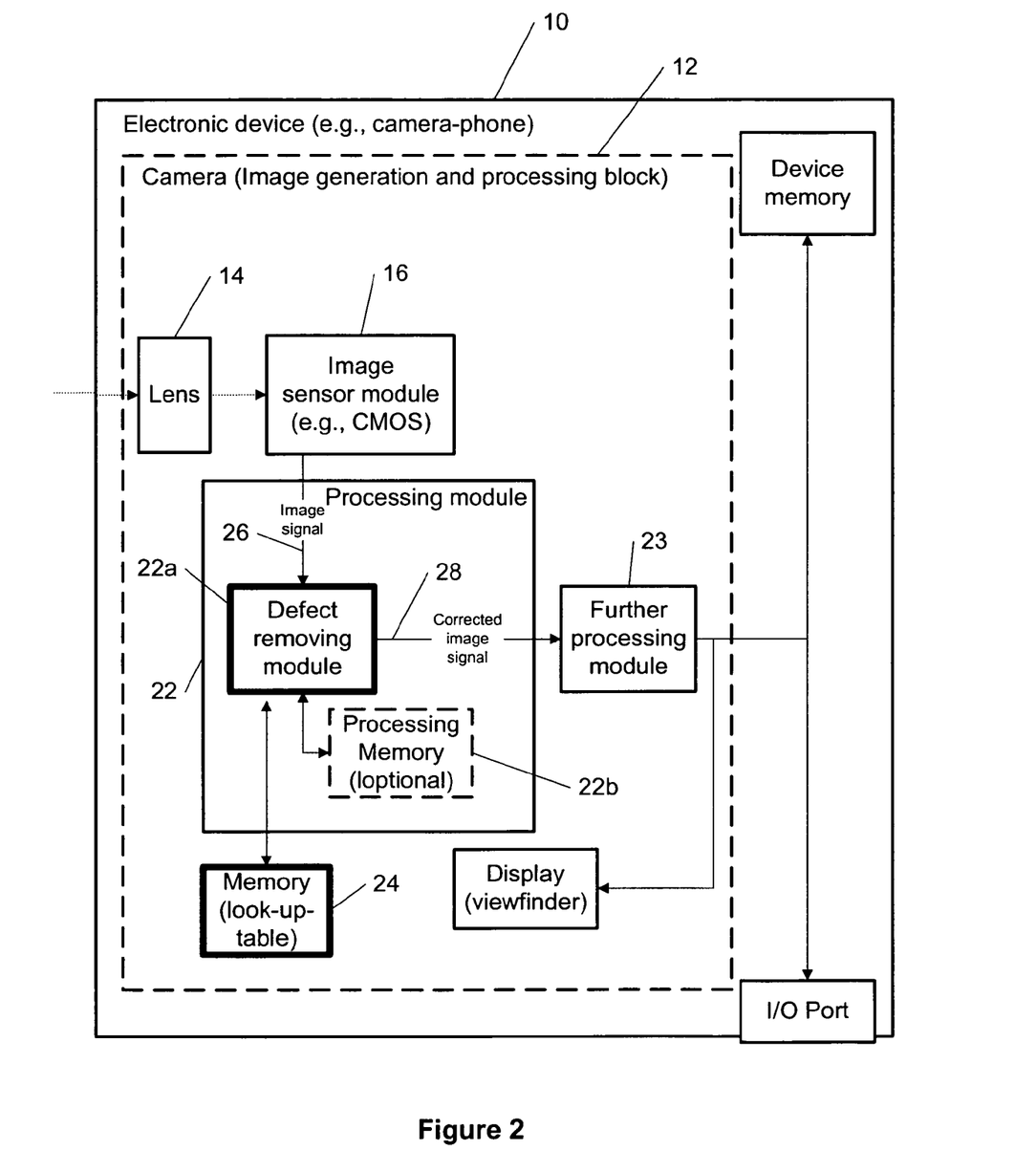
FIG. 2 is a block diagram of an electronic device comprising a camera for a singlet and couplet defect removal from images taken by the electronic device, according to an embodiment of the present invention.

FIG. 2 shows an example among others of a block diagram of an electronic device 10 comprising a camera 12 providing image generation and processing for a singlet and couplet defect removal from images taken by the camera 12, according to an embodiment of the present invention. The electronic device 10 can be, but is not limited to, a camera, a digital camera, a wireless communication device, a mobile phone, a camera-phone mobile device, a portable electronic device, non-portable electronic device, etc.

The camera 12 can comprise a lens 14 and an image sensor module 16 (e.g., using the CMOS sensor) for capturing the image to provide an image signal 26 (e.g., a raw Bayer image). A processing module 22 can comprise a defect removing module 22a which can be used for performing the defect analysis and correction with the second order ranking detection by the predetermined algorithm, according to embodiments of the present invention, optionally using a processing memory 22b for the on-the-fly processing (the processing memory 22b can be a part of any other memory or of a module of the electronic device 10).

The corrected image signal 28 with the removed singlet and couplet defects, generated by the module 22a, can be provided to a further processing module 23 (e.g., for spatial filtering) and then can be further provided (optionally) as an output to different modules of the electronic device 10, e.g., to a display (viewfinder) for viewing, to a device memory for storing, or to an input/output (I/O) port for forwarding to a desired destination.

The look-up table comprising pixel defect statistics, as described above, can be generated by the module 22a (or by another equivalent module with the input information from the module 22a), and the map with the coordinates of the pixels with the singlet and couplet defects can be saved and stored in a look-up memory 24 for correcting the defects in the following images (the memory 24 can be a part of any other memory or a module of the electronic device 10).

The module 24 can be a dedicated block in the camera module 12 or it can be incorporated within the module 22 or other modules of the electronic device 10.

According to an embodiment of the present invention, the module 22 can be implemented as a software or a hardware block or a combination thereof. Furthermore, the module 22 can be implemented as a separate block or can be combined with any other block or module of the electronic device 10 or it can be split into several blocks according to their functionality.

Figure 3:
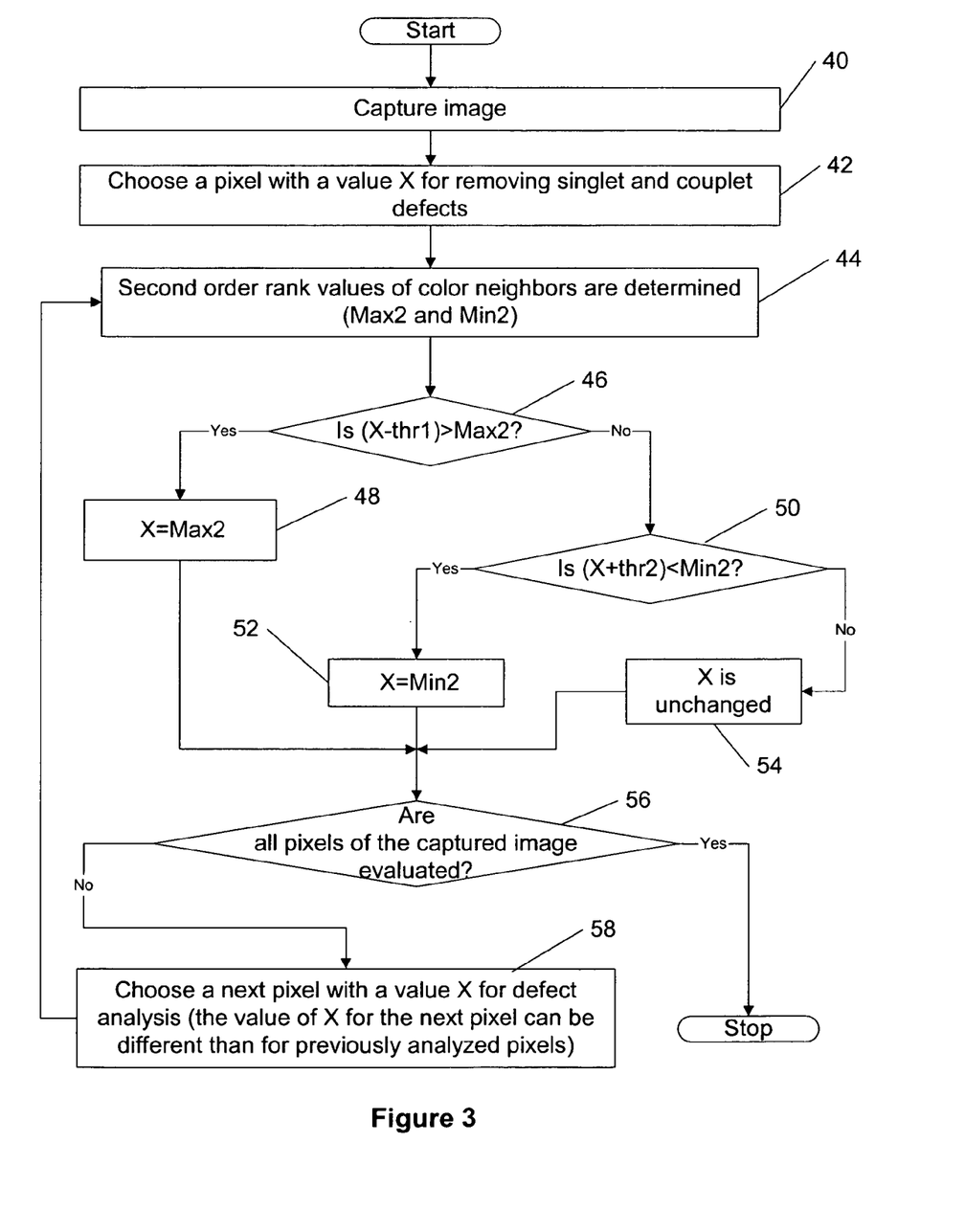
FIG. 3 is a flow chart for a singlet and couplet defect removal from images taken by the electronic device, according to an embodiment of the present invention.

FIG. 3 shows a flow chart for a singlet and couplet defect removal from images taken, e.g., by the electronic device 10 of FIG. 2, according to an embodiment of the present invention. It is noted that the order of steps shown in FIG. 3 is not absolutely required, so in principle, the various steps can be performed out of order.

The flow chart of FIG. 3 only represents one possible scenario among others. In a method according to the embodiment of the present invention, in a first step 40, the image is captured (e.g., see the image signal 26 in FIG. 2) by the camera 12. In a next step 42, a pixel with a value X (here X is used as a variable instantaneous value) is chosen for removing singlet and couplet defects. In a next step 44, the second order rank values (Max2 and/or Min2) of appropriate color neighbors are determined (according to the predetermined algorithm), e.g., by the module 22a shown in FIG. 2 using Equations 1 and 2.

In a next step 46, it is ascertained (e.g., by the module 22a) whether X−thr1 is larger than Max2, wherein thr1 is the predefined first threshold as described above. If that is the case, in a next step 48, the pixel value X is adjusted to be Max2 and the process goes to step 56. However, if it is ascertained that X−thr1 is not larger than Max2, in a next step 50, it is ascertained (e.g., by the module 22a) whether X+thr2 is smaller than Min2. If that is the case, in a next step 52, the pixel value X is adjusted to be Min2 and the process goes to step 56. However, if it is ascertained that X+thr2 is not smaller than Min2, in a next step 54, the pixel value X stays unchanged.

In a next step 56, it is ascertained (e.g., by the module 22a) whether all pixels of the captured image are evaluated for the defect removal. If that is the case, the process stops. However, if it is ascertained that not all pixels are evaluated, in a next step 58, a next pixel with a value X is chosen for the defect analysis and removal (the value of X for the next pixel can be different than for previously analyzed pixels) and the process goes back to step 44.

Figure 4:
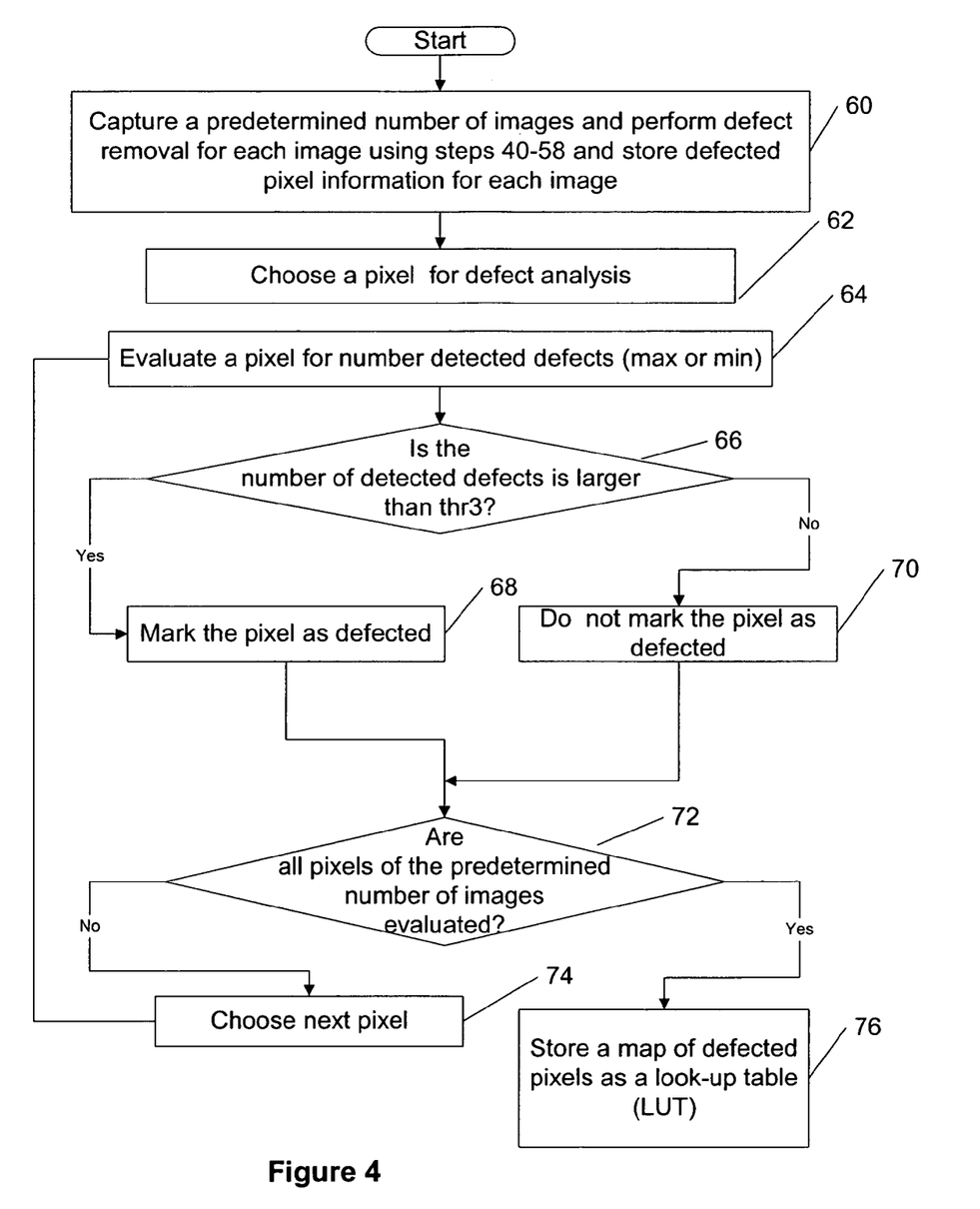
FIG. 4 is a flow chart for using a defect removal from images taken by the electronic device to generate a look-up table of defective pixels, according to an embodiment of the present invention

FIG. 4 shows a flow chart for using a defect removal from images taken, e.g., by the electronic device 10 of FIG. 2 to generate a look-up table (LUT) of defective pixels, and to store this LUT in the memory 24, according to an embodiment of the present invention. It is noted that the order of steps shown in FIG. 4 is not absolutely required, so in principle, the various steps can be performed out of order.

The flow chart of FIG. 4 only represents one possible scenario among others. In a method according to another embodiment of the present invention, in a first step 60, a predetermined number (or a plurality) of images is captured by the camera 12 and the defect removal is performed for each image using steps 40-58 shown in FIG. 3 and defected pixel information for each image, e.g., as a pixel map, is stored. In a next step 62, one pixel in the plurality of images is chosen for the analysis. In a next step 64, this chosen pixel is evaluated for a number of detected defects, e.g., maximum and/or minimum defects (including singlet and couplet defects) in all taken and corrected images.

In a next step 66, it is ascertained (e.g., by the module 22a) whether the number of detected defects is larger than thr3, wherein thr3 is the predefined third threshold as described above. If that is not the case, the process goes to step 72. However, if it is ascertained that the number of detected defects is larger than thr3, in a next step 68, the pixel is marked as defective.

In a next step 72, it is ascertained (e.g., by the module 22a) whether all the pixels of the predetermined number of the images are evaluated. If that is not the case, in a next step 74, a next pixel is chosen for the evaluation and the process goes to step 64. However, if it is ascertained that all the pixels are evaluated, in a next step 76, a map with coordinates of defected pixels is saved as a look-up table (LUT), e.g., in the memory 24. This LUT can be used for correcting the defects in the following images taken by camera 12 of the electronic device 10.

It is noted that the analysis described in FIG. 4 can be performed for the minimum and maximum defects separately, so essentially 2 pixel maps for the minimum and for the maximum defects can be stored separately in the memory 24, if needed.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method comprising:

capturing at least one image by an electronic device; and removing by said electronic device at least singlet and couplet defects from said at least one image using a defect detection and correction mechanism with a second or higher order ranking by a predetermined algorithm, wherein said defect detection and correction mechanism for each pixel comprises:

determining second order ranking values of all neighboring pixels of said each pixel, wherein said second order ranking values comprise at least:

a second maximum ranking value, wherein defect detection and correction mechanism of said each pixel further comprises:

equating a value of said each pixel to said second maximum ranking value if a difference between said value and a predefined first threshold is larger than said second maximum ranking value; and keeping said value of said each pixel unchanged if the difference between said value and the predefined first threshold is not larger than said second maximum ranking value.

2. The method of claim 1, wherein said second order ranking values also comprise a second minimum ranking value and wherein the defect detection and correction mechanism for said each pixel further comprises:

equating said value of said each pixel to said second minimum ranking value if the difference between said value and the predefined first threshold is not larger than said second maximum ranking value, and if a sum of said value and a predetermined second threshold is smaller than said second minimum ranking value; and keeping said value of said each pixel unchanged if said difference between said value and the predefined first threshold is not larger than said second maximum ranking value and if the sum of said value and the predefined second threshold is not smaller than said second minimum ranking value.

3. The method of claim 2, wherein said first or said second threshold is between 0.5 and 5 percent of an available dynamic range of said value of said each pixel.

4. The method of claim 1, wherein said first threshold is between 0.5 and 5 percent of an available dynamic range of said value of said each pixel.

5. The method of claim 1, wherein all said neighboring pixels have the same color as said each pixel.

6. The method of claim 1, wherein eight neighboring pixels for said each pixel are used for said determining of said second order ranking values.

7. The method of claim 1, wherein a plurality of images of said at least one image are captured by said electronic device and said at least singlet and couplet defects are removed from said plurality of images using said defect detection and correction mechanism with the second or higher order ranking by the predetermined algorithm.

8. The method of claim 7, further comprising said electronic device:

evaluating each pixel of said plurality of images for a number of defects detected in said each pixel using said defect detection and correction mechanism;

marking said each pixel as defected if a number of detected defects for said each pixel in said plurality of the images is larger than a predefined third threshold;

creating a map of said defected pixels; and storing said map in a memory of said electronic device for correcting defects in further images.

9. The method of claim 1, wherein said electronic device comprises a camera performing said capturing and said removing.

10. The method of claim 1, wherein said at least one image iris one of:

a) a Bayer image, and b) a downscaled Bayer image.

11. A tangible memory device comprising non-transitory computer program code stored thereon for retrieval and execution by a computer processor, wherein said computer program code comprises instructions for performing the method of claim 1.

12. An electronic device, comprising:

an image sensor module, for capturing at least one image;

a memory including computer program code; and a processing module, wherein the memory and the computer program code are configured to, with the processing module, cause the electronic device at least to remove at least singlet and couplet defects from said at least one image frame using a defect detection and correction mechanism with a second or higher order ranking by a predetermined algorithm, wherein said defect detection and correction mechanism of a pixel comprises the memory and the computer program code configured to, with the processing module, cause the electronic device to determine second order ranking values of neighboring pixels of said pixel, wherein said second order ranking values comprise at least:

a second maximum ranking value, wherein defect detection and correction mechanism of said pixel further comprises the memory and the computer program code configured to, with the processing module, cause the electronic device to:

equate a value of said each pixel to said second maximum ranking value if a difference between said value and a predefined first threshold is larger than said second maximum ranking value:

keep said value of said each pixel unchanged if the difference between said value and the predefined first threshold is not larger than said second maximum ranking value.

13. The electronic device of claim 12, wherein said processing module is a part of said image sensor module.

14. The electronic device of claim 12, wherein the defect detection and correction mechanism of said pixel further comprises the memory and the computer program code configured to, with the processing module, cause the electronic device to:

equate said value of said each pixel to said second minimum ranking value if the difference between said value and the predefined first threshold is not larger than said second maximum ranking value, and if a sum of said value and a predetermined second threshold is smaller than said second minimum ranking value; and keep said value of said each pixel unchanged if said difference between said value and the predefined first threshold is not larger than said second maximum ranking value and if the sum of said value and the predefined second threshold is not smaller than said second minimum ranking value.

15. The electronic device of claim 12, wherein all said neighboring pixels have the same color as said each pixel.

16. The electronic device of claim 12, wherein eight neighboring pixels for said each pixel are used for said determining of said second order ranking values.

17. The electronic device of claim 12, wherein said memory and the computer program code are configured, with the processing module, cause the electronic device to capture a plurality of images of said at least one image and to remove said at least singlet and couplet defects from said plurality of images using said defect detection and correction mechanism with the second or higher order ranking by the predetermined algorithm.

18. The electronic device of claim 17, wherein said memory and the computer program code are further config ured to, with the processing module, cause the electronic device:
- to evaluate each pixel of said plurality of images for a number of defects detected in said each pixel using said defect detection and correction mechanism;
- to mark said each pixel as defected if a number of detected defects for said each pixel in said plurality of the images is larger than a predefined second threshold;
- to create a map of said defected pixels; and
- to store said map in a memory of said electronic device for correcting defects in further images.

19. The electronic device of claim 12, wherein said at least one image is one of:
   c) a Bayer image, and
   d) a downscaled Bayer image.

20. The electronic device of claim 12, wherein said image sensor module is a complimentary metal oxide semiconductor sensor or a charge coupled device.

21. An electronic device, comprising:
   means for capturing at least one image by an electronic device;
   means for storing non-transitory computer program code; and
   means for removing at least singlet and couplet defects from said at least one image using a defect detection and correction mechanism with a second or higher order ranking by executing said computer program code to cause said electronic device to carry out a predetermined algorithm, wherein said defect detection and correction mechanism for each pixel comprises:
   determining second order ranking values of all neighboring pixels of said each pixel, wherein said second order ranking values comprise at least a second maximum ranking value, and wherein said defect detection and correction mechanism of said each pixel further comprises:
   equating a value of said each pixel to said second maximum ranking value if a difference between said value and a predefined first threshold is larger than said second maximum ranking value; and
   keeping said value of said each pixel unchanged if the difference between said value and the predefined first threshold is not larger than said second maximum ranking value.

22. The electronic device of claim 21, wherein said means for capturing is an image sensor module.

* * * * *

UNITED STATES PATENT AND TRADEMARK OFFICE
CERTIFICATE OF CORRECTION

| | | |
|---|---|---|
| PATENT NO. | : 7,796,806 B2 | Page 1 of 1 |
| APPLICATION NO. | : 11/527326 | |
| DATED | : September 14, 2010 | |
| INVENTOR(S) | : Ossi Kalevo | |

It is certified that error appears in the above-identified patent and that said Letters Patent is hereby corrected as shown below:

In column 9, line 60 (claim 10, line 2), "iris" should be --is--.

In column 10, line 17 (claim 12, line 17) ":" should be deleted.

Signed and Sealed this
Eleventh Day of January, 2011

David J. Kappos
*Director of the United States Patent and Trademark Office*